(12) United States Patent
Yokoi et al.

(10) Patent No.: US 8,961,658 B2
(45) Date of Patent: Feb. 24, 2015

(54) MIST/DUST COLLECTOR

(71) Applicant: Anlet Co., Ltd., Aichi (JP)

(72) Inventors: Yasuna Yokoi, Aichi (JP); Yoshinobu Ito, Mie (JP); Toshiaki Kato, Aichi (JP); Kouiti Kume, Aichi (JP); Hideyuki Okano, Aichi (JP)

(73) Assignee: Anlet Co., Ltd., Aichi (JP)

( * ) Notice: Subject to any disclaimer, the term of this patent is extended or adjusted under 35 U.S.C. 154(b) by 0 days.

(21) Appl. No.: 14/108,532

(22) Filed: Dec. 17, 2013

(65) Prior Publication Data

US 2014/0305304 A1    Oct. 16, 2014

(30) Foreign Application Priority Data

Apr. 12, 2013 (JP) ................. 2013-083517

(51) Int. Cl.
| | |
|---|---|
| *B01D 47/00* | (2006.01) |
| *B01D 50/00* | (2006.01) |
| *B01D 45/08* | (2006.01) |
| *B01D 45/14* | (2006.01) |
| *B03C 1/30* | (2006.01) |
| *B03C 1/025* | (2006.01) |

(52) U.S. Cl.
CPC ............ *B01D 50/00* (2013.01); *B01D 45/08* (2013.01); *B01D 45/14* (2013.01); *B03C 1/30* (2013.01); *B03C 1/025* (2013.01); *B03C 2201/20* (2013.01)
USPC ............ 96/1; 95/28; 95/218; 96/281; 96/282; 96/285; 96/356; 96/359

(58) Field of Classification Search
None
See application file for complete search history.

(56) References Cited

U.S. PATENT DOCUMENTS

2008/0083333 A1 * 4/2008 Yokoi et al. ............... 95/277

FOREIGN PATENT DOCUMENTS

| JP | 2007222832 A | * | 9/2007 |
|---|---|---|---|
| JP | 4118851 B2 | | 5/2008 |
| JP | 2011-067740 A | | 4/2011 |

OTHER PUBLICATIONS

English Translation of JP 2011067740.*

* cited by examiner

*Primary Examiner* — Duane Smith
*Assistant Examiner* — Phillip Shao
(74) *Attorney, Agent, or Firm* — Cermak Nakajima & McGowan LLP; Tomoko Nakajima (57) ABSTRACT

A mist/dust collector includes a tank body, a recovery tank having a demister member, a spraying unit spraying water or coolant fluid from a nozzle, an impeller mounted on a main shaft located in the tank body, so as to be rotatable by air flow, a disc rotary brush and a shaking-off member mounted on the shaft. A suction unit is actuated to draw air containing mist and dust into the tank body interior maintained in a negative pressure state. The impeller is rotated by collision of water or coolant fluid at a predetermined pressure, and the rotary brush and the shaking-off member are rotated simultaneously with the impeller, so that mist and dust are separated from air by a centrifugal action of the rotary brush and the shaking-off member. Mist and dust remaining in the air flowing into the recovery tank are collected by the demister member.

12 Claims, 7 Drawing Sheets

MIST/DUST COLLECTOR

CROSS-REFERENCE TO RELATED APPLICATIONS

This application is based upon and claims the benefit of priority from the prior Japanese Patent Application No. 2013-83517 filed on Apr. 12, 2013, the entire contents of which are incorporated herein by reference.

BACKGROUND

1. Technical Field

The present disclosure relates to a collector which collects mist arising from machining of machine parts and components by a machine tool and fine dust such as chips, shavings and grinding sludge to prevent the mist and fine dust from scattering around.

2. Related Art

Various types of structures have conventionally been known as mist/dust collectors. These types include a filter type, a demister type, a cyclone type, a collision plate type and an electrical precipitation type. For example, Japanese Patent No. 4118851 granted to the applicant of the present patent application discloses a mist/dust collector including a separation tank eliminating mist and dust from air, an electric motor disposed above the separation tank and a disc rotary brush and a shaking-off member both mounted on an output shaft of the motor. The mist/dust collector further includes a horn member provided in a lower interior of the separation tank so as to be spread toward a bottom of the separation tank. A turbofan is connected to an exhaust side of the horn member. The mist/dust collector is structured to separate mist and dust by a centrifugal action of the rotary brush and shaking-off member, an air flow speed reducing action of the horn member and to discharge the separated mist and dust from a lower part of the tank to a predetermined location through an outlet duct.

Japanese Patent Application Publication No. JP-A-2011-67740 also discloses a mist/dust collector including a separation tank eliminating mist and dust from air, an electric motor disposed above the separation tank and a disc rotary brush and a shaking-off member both mounted on an output shaft of the motor. The mist/dust collector further includes a horn member provided in a lower interior of the separation tank so as to be spread toward a bottom of the separation tank. A turbofan is connected to an exhaust side of the horn member. The mist/dust collector can efficiently collect mist and dust by a synergistic action of a centrifugal force of the rotary brush and shaking-off member, an air flow speed reducing action of the horn member and filtration of the demister. The mist/dust collector is further structured to eliminate iron fine dust contained in the separated dust by a magnet separator.

Each of the above-mentioned collectors necessitates the motor driving the rotary brush and a control device to control the motor and the like, resulting in an increase in the manufacturing cost.

SUMMARY

Therefore, an object of the disclosure is to provide a mist/dust collector which is suitable for collection of mist and dust and can render collected dust easier to recover and can decrease the manufacturing cost.

The present disclosure provides a mist/dust collector including a tank body having an air inlet and separating mist and dust from air drawn thereinto through the air inlet, a recovery tank disposed so as to communicate with a lower part of the tank body, the recovery tank having a demister member provided therein, a suction unit connected to an exhaust side of the recovery tank, a spraying unit having a nozzle which is disposed near the air inlet so as to face an interior of the tank body, the spraying unit spraying water or a coolant fluid of a machine tool from the nozzle, a generally vertical main shaft located at the central interior of the tank body and rotatably supported by a bearing unit, an impeller mounted on the main shaft so as to be rotatable by a flow of the air, at least one disc rotary brush having a large number of brush pieces radially protruding therefrom, and a shaking-off member mounted on the main shaft together with the impeller and the rotary brush. In the collector, the suction unit is actuated to draw air containing mist and dust into the interior of the tank body maintained in a negative pressure state. The impeller is rotated by collision of the water or the coolant fluid sprayed from the nozzle at a predetermined pressure and the rotary brush and the shaking-off member are rotated simultaneously with the impeller, so that the mist and the dust are separated from the air by a centrifugal action of the rotary brush and the shaking-off member. The mist and the dust remaining in the air flowing into the recovery tank are collected by the demister member.

The above-described mist/dust collector is mainly constructed to be suitable for collection of mist generated during machining of machine parts, components or the like by a machine tool. Mist can efficiently be collected by a synergistic action of knocking off by a centrifugal force of the disc rotary brush, shaking-off by a centrifugal force of the shaking-off member and filtering by the demister member. In addition, the mist/dust collector employs the structure of rotating the impeller, the rotary brush and the shaking-off member by a synergistic action of collision of a powerful air flow caused by actuation of the suction unit and water or the coolant fluid used in the machine tool, either sprayed from the nozzle of the spraying unit at the predetermined pressure. This requires no electric motor driving the above-mentioned devices and no control device controlling the motor and the like, reducing the manufacturing costs.

Furthermore, the spraying unit is constructed to spray the water or the coolant fluid used in the machine tool to the impeller at the predetermined pressure. Since fine dust adherent to the rotary brush is washed away thereby to be eliminated, the collecting efficiency can be improved.

The disclosure also provides a mist/dust collector including a tank body having an air inlet and separating mist and dust particles from air drawn through the air inlet, a recovery tank disposed so as to communicate with a lower part of the tank body, the recovery tank having a demister member provided therein, a suction unit connected to an exhaust side of the recovery tank, a spraying unit having a nozzle which is disposed near the air inlet so as to face an interior of the tank body, the spraying unit spraying water or a coolant fluid of a machine tool from the nozzle, a magnet separator disposed below the recovery tank and including a magnet attracting iron dust, a generally vertical main shaft located at the central interior of the tank body and rotatably supported by a bearing unit, an impeller mounted on the main shaft so as to be rotatable by a flow of the air, at least one disc rotary brush having a large number of brush pieces radially protruding therefrom, a shaking-off member mounted on the main shaft together with the impeller and the rotary brush. In the collector, the suction unit is actuated to draw air containing mist and dust into the interior of the tank body maintained in a negative pressure state. The impeller is rotated by collision of the water or the coolant fluid sprayed from the nozzle at a predetermined pressure and the rotary brush and the shaking-off member are rotated simultaneously with the impeller, so that the mist and the dust are separated from the air by a centrifugal action of the rotary brush and the shaking-off member. The mist and dust remaining in the air flowing into the recovery tank is collected by the demister member. Iron dust contained in the dust separated in the tank body and discharged from the tank body is attracted by the magnet separator thereby to be removed.

The above-described mist/dust collector is mainly constructed to be suitable for collection of chips or shavings generated during machining of machine parts, components or the like by a machine tool. Dust can efficiently be collected by a synergistic action of knocking off by a centrifugal force of the disc rotary brush, shaking-off by a centrifugal force of the shaking-off member and filtering by the demister member. In addition, the mist/dust collector employs the structure of rotating the impeller, the rotary brush and the shaking-off member by a synergistic action of collision of a powerful air flow caused by actuation of the suction unit and water sprayed from the nozzle of the spraying unit at the predetermined pressure. This requires no electric motor driving the above-mentioned devices and no control device controlling the motor and the like, reducing the manufacturing costs.

Furthermore, water at the predetermined pressure is sprayed from the nozzle of the spraying unit to the impeller. Since the fine dust adherent to the rotary brush is washed away thereby to be removed, the collection efficiency can be improved. Still furthermore, iron fine dust separated from the air in the tank body is removed by the magnet separator thereby to be smoothly recovered.

BRIEF DESCRIPTION OF THE DRAWINGS

In the accompanying drawings.

DETAILED DESCRIPTION

Figure 1:
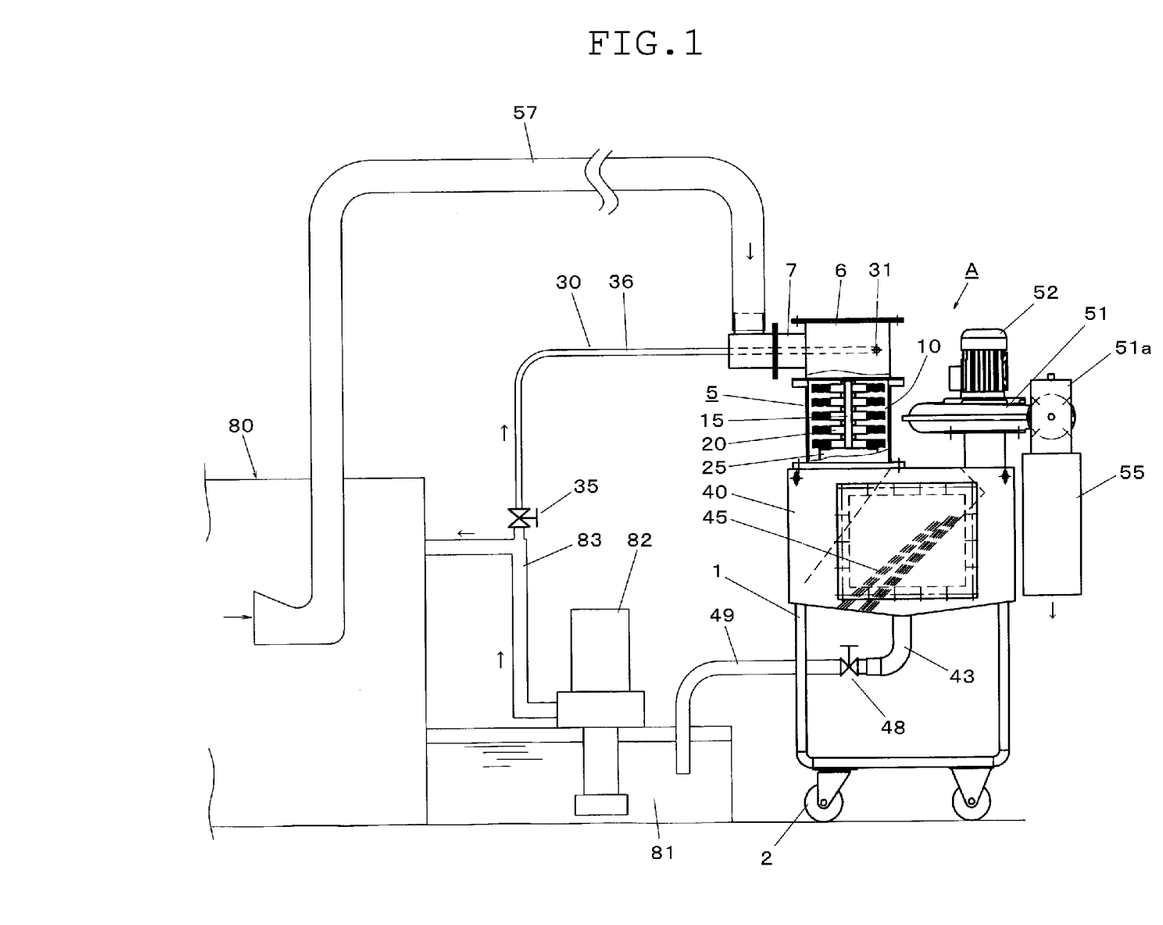
FIG. 1 is a front view of a mist/dust collector in accordance with a first embodiment.
Figure 2:
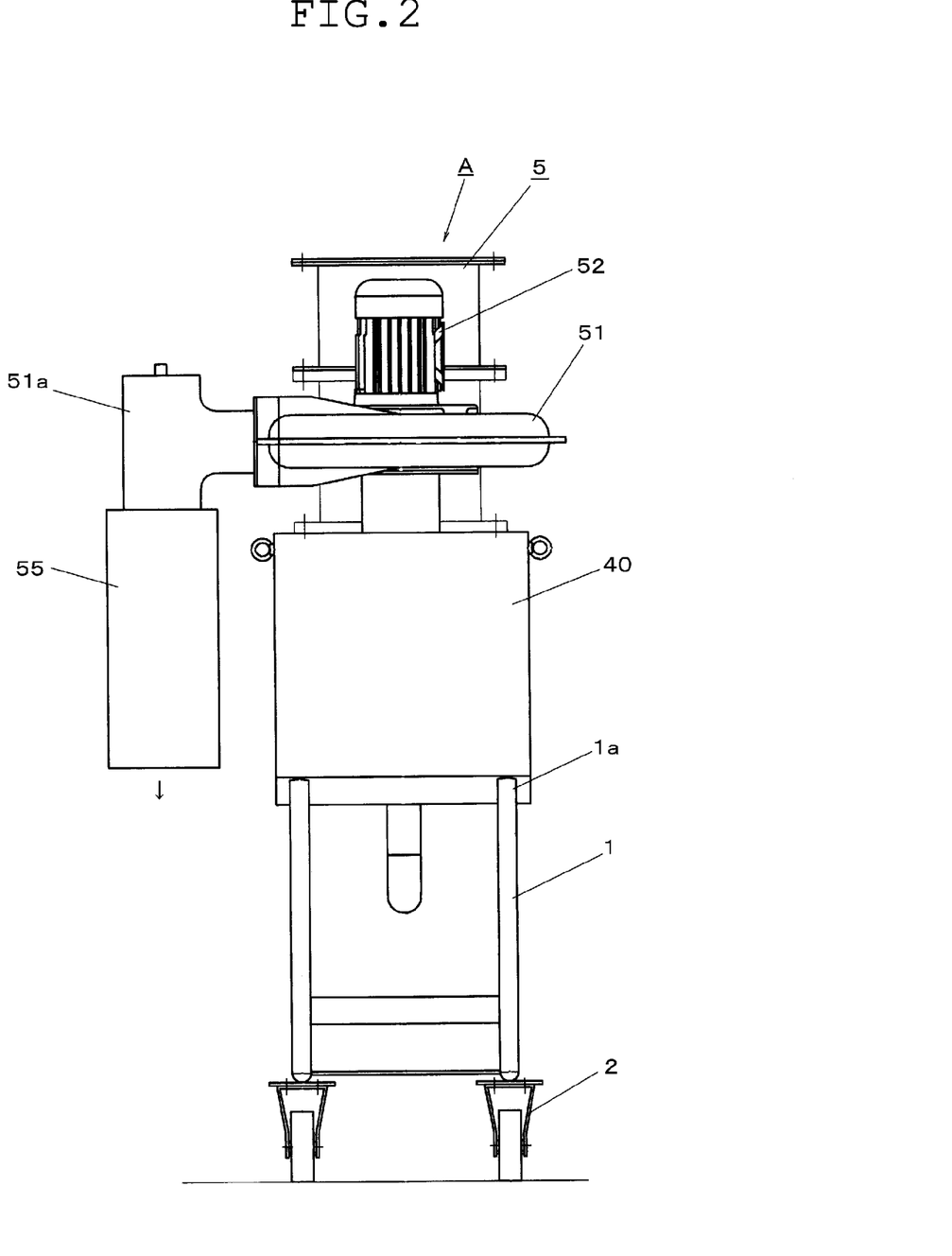
FIG. 2 is a side elevation of the mist/dust collector.

An embodiment will be described with reference to the accompanying drawings. Referring to FIG. 1, the mist/dust collector A in accordance with the embodiment is shown. The mist/dust collector A is mainly constructed to be suitable for collection of mist generated by aerification of a coolant fluid used as a coolant when machine parts and components or the like are ground by a machine tool. The collector A includes a tank body 5 separating mist, a spraying unit 30 having a nozzle 31 provided so as to face an interior of the tank body 5, a recovery tank 40 provided with a demister member attached therein and a turbofan 51 serving as a suction unit connected to the exhaust side of the recovery tank 40.

Figure 4:
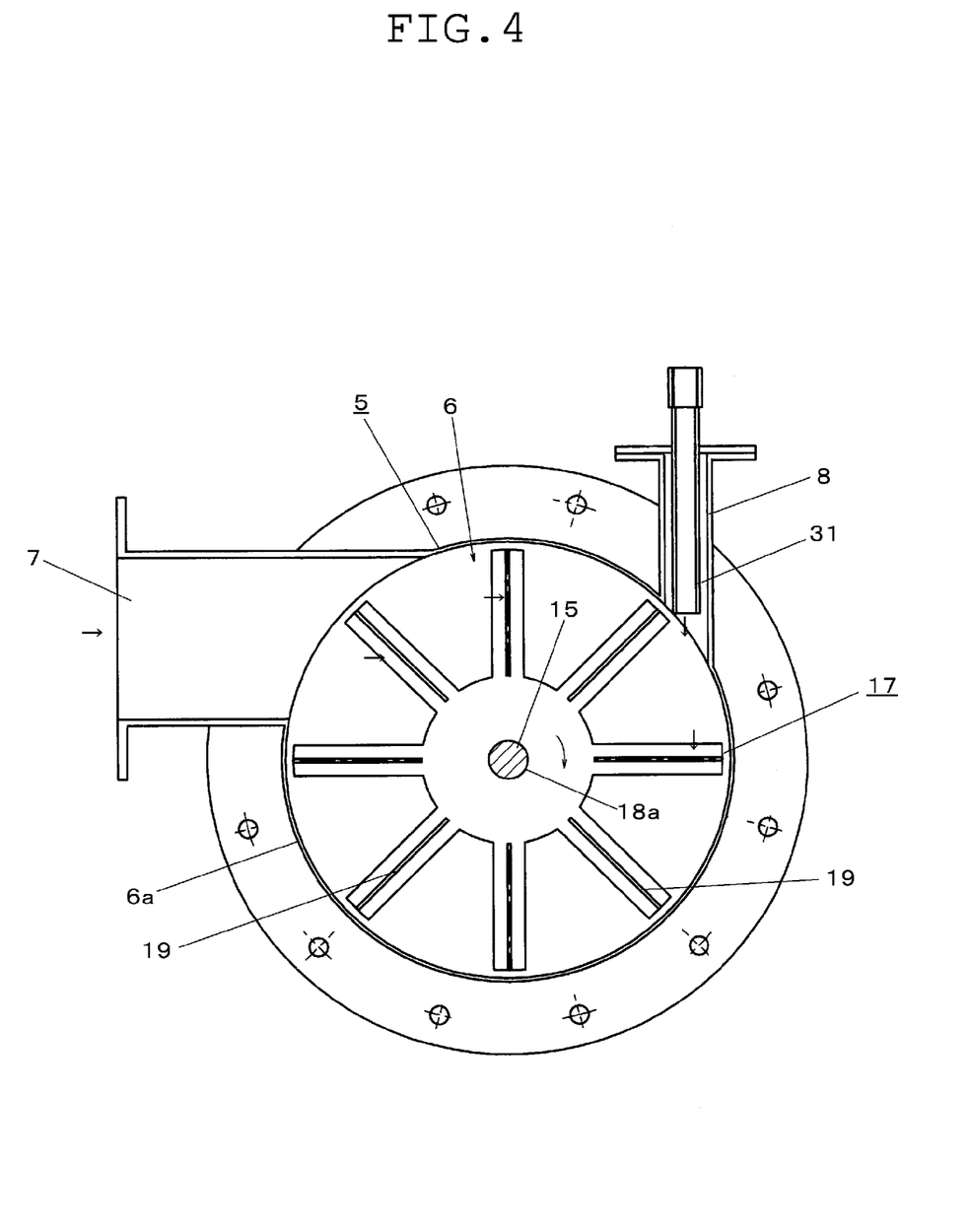
FIG. 4 is a sectional view taken along line X-X in FIG. 3.

The tank body 5 is formed into a cylindrical shape and vertically disposed on an upper part 1a of a frame 1 having casters 2, as shown in FIG. 1. The tank body 5 has an interior divided into an upper introduction chamber 6 and a lower separation chamber 10. The introduction and separation chambers 6 and 11 are connected together by bolts (not shown) thereby to be integrally formed. Both chambers are separable when unbolted. A suction member 7 having an inlet is mounted on a part of peripheral wall 6a of the introduction chamber 6 and has a diameter of about 105 mm. An introduction pipe 8 is mounted on another part of the peripheral wall 6a located near the inlet 7 as shown in FIG. 4. The spraying unit 30 includes a nozzle 31 which is inserted into the introduction pipe 8 as will be described later. The introduction pipe 8 communicates with the interior of the introduction chamber 6. A suction pipe 57 is connected to the inlet 7 to draw mist generated in a machine tool.

Figure 3:
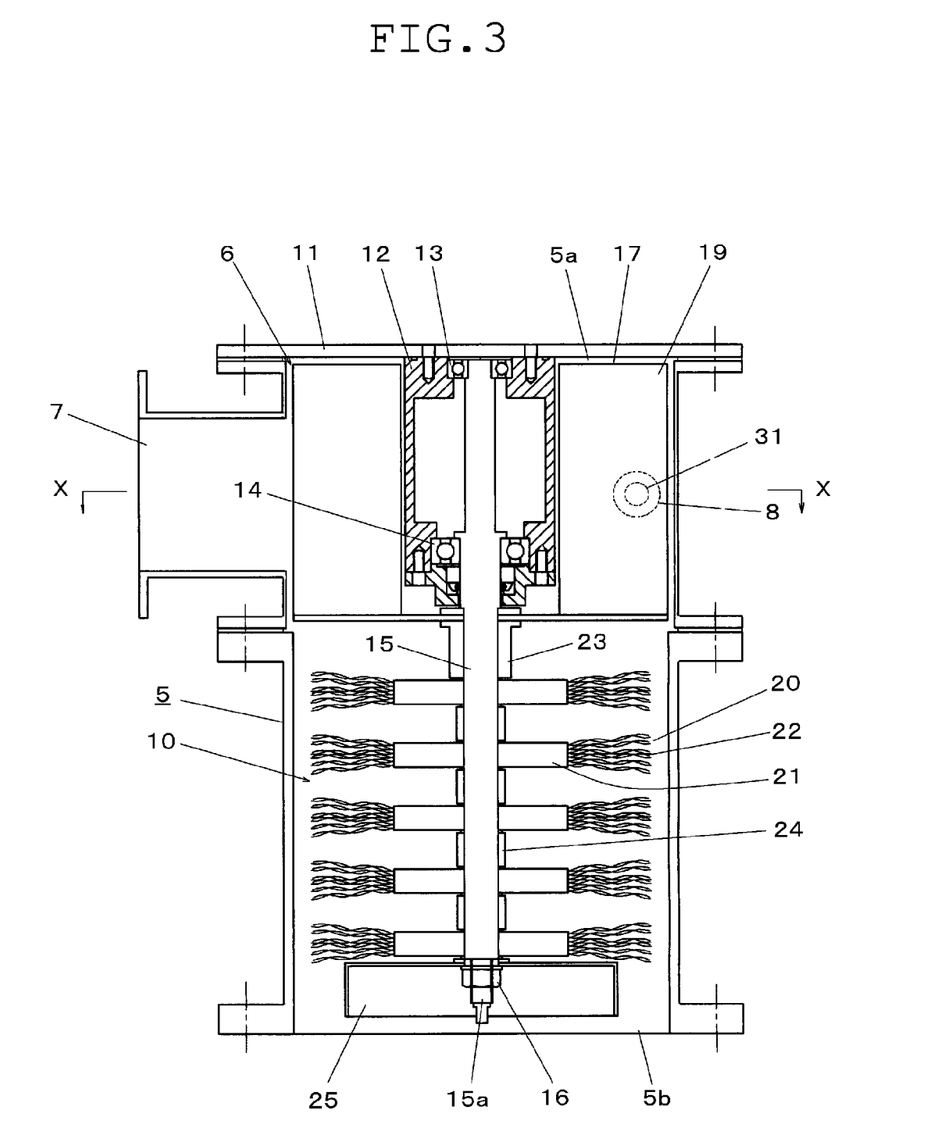
FIG. 3 is a longitudinal section of a tank body.

The introduction chamber 6 has an upper opening 5a in which a lid 11 mounted as shown in FIG. 3. The lid 11 has an underside to which a bearing unit 12 incorporating two bearings 13 and 14 is mounted. A vertical main shaft 15 is rotatably supported on the bearings 13 and 14. The shaft 15 is disposed in the center of the interior of the tank body 5.

On the shaft 15 are mounted an impeller 17 which is rotatable by a flow of air flowing through the inlet 7 into the introduction chamber 6, a bush 23 and five disc rotary brushes 20 with spacers 24 being interposed between the brushes 20, all of which are disposed sequentially in this order with the impeller 17 at the top. The lowermost disc rotary disc 20 has a downwardly extending threaded part 15a protruding therefrom. The threaded part 15a is inserted through a hole (not shown) of a deep-dish-shaped shaking-off member 25, and a nut 16 is tightened with the result that the shaking-off member 25 is fixed to the shaft 15.

The impeller 17 has a hole 18a through which the shaft 15 extends and eight blades 19 formed about the hole 18a integrally therewith. The blades 19 have an outer diameter of 275 mm, a width of 79.5 mm, a height of 190 mm, a thickness of 2.3 mm and a weight of about 2 kg.

The above-described rotary brush 20 has the same structure as a disc rotary brush disclosed in Japanese Patent No. 4118851 granted to the applicant of the present application. More specifically, the rotary brush 20 has a number of brush strips 22 radially protruding from an outer periphery of a fixing part 21 formed with a shaft hole through which the shaft 15 attached. The rotary brush 20 has an outer diameter of about 250 mm and a thickness of about 30 mm. The brush strips 22 are made of hard steel or stainless steel.

The spraying unit 30 is constructed to rotate the impeller 17 by collision of the water or the coolant fluid sprayed from the nozzle 31 at a predetermined pressure. The collecting apparatus A is further constructed to reliably rotate the impeller 17 by a synergistic action of a spraying operation of the spraying unit 30 and an air flow due to a negative pressure operation caused by a turbofan 51 as will be described later.

The used water is tap water or well water. The case where coolant fluid is used will be described in the following. Referring to FIG. 1, a coolant tank 81 is annexed to a machine tool such as a grinding machine. A coolant pump 82 is provided for supplying coolant stored in the coolant tank 81 to a required position. The coolant pump 82 is connected to a predetermined part of the machine tool 80 by a supply pipe 83. A branch pipe 36 is connected to the supply pipe 83 and extends via a stop valve 35 to the nozzle 31.

Regarding the use of coolant in a machine tool of the embodiment, breeding of putrefactive bacteria (anaerobic microorganism) sometimes produces foul odor, resulting in environmental issues. In view of the problem, when coolant is used with the mist/dust collector A, air is mixed with the coolant during operation. Consequently, it is confirmed that a dissolved oxygen level in the liquid can be improved with the result that breeding of the putrefactive bacteria can be suppressed. This contributes to prevention of foul odor.

Figure 5:
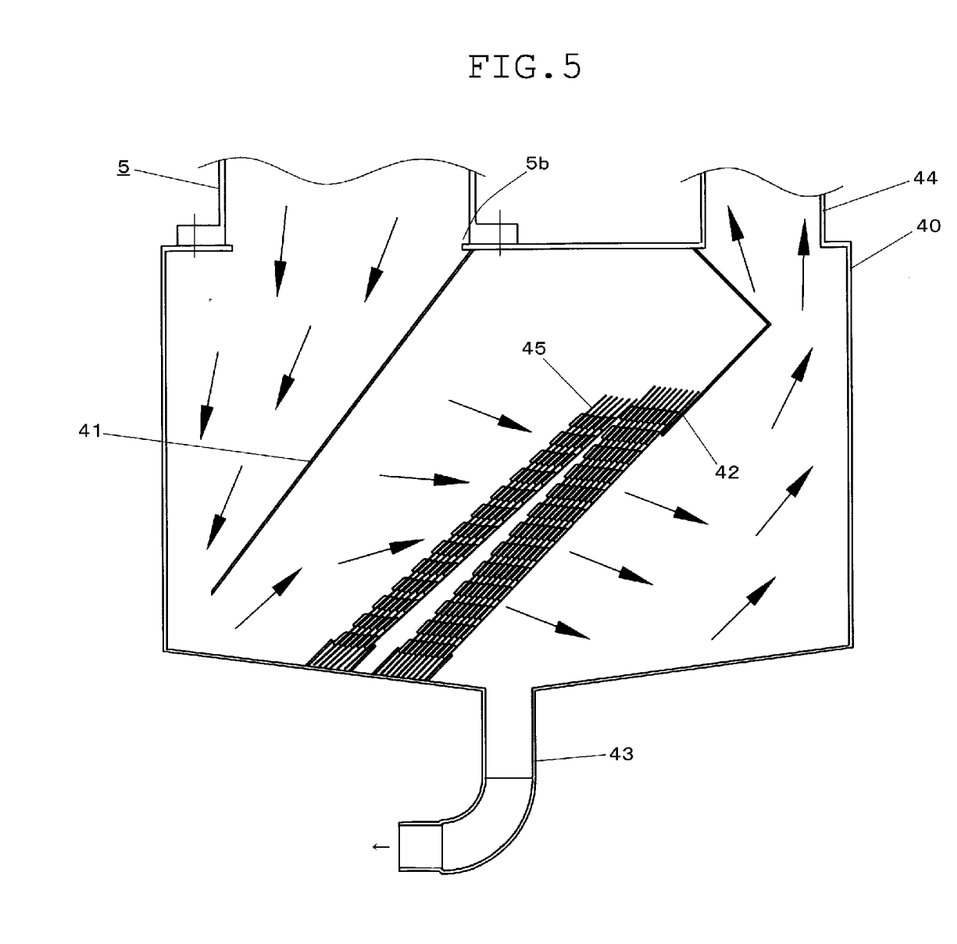
FIG. 5 is a longitudinal section of a recovery tank.

The recovery tank 40 is disposed so as to communicate with a lower opening 5b of the tank body 5. As shown in FIG.

5, the recovery tank 40 includes a front partition plate 41 and a rear partition plate 42 both of which partition an interior thereof to define an air flow passage. A louver-type demister 45 serving as a demister member is attached between the front and rear partition plates 41 and 42. A discharge pipe 43 is provided for discharging fluid stored in the recovery tank 40. The stop valve 48 is mounted to the discharge pipe 43, and a drain pipe 49 is connected to the stop valve 48. The drain pipe 49 extends to the coolant tank 81.

Figure 6:
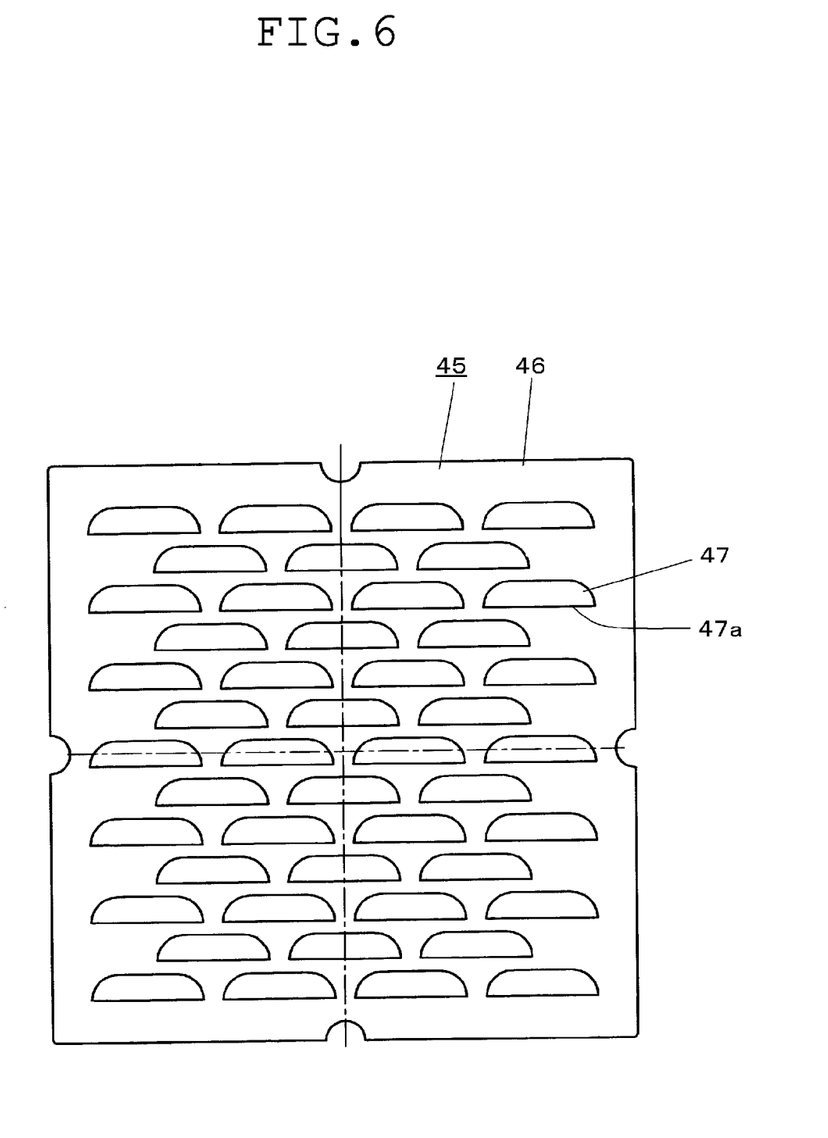
FIG. 6 is a front view of a louver-type demister.

The louver-type demister 45 includes fifteen square flat plates 46 disposed in the recovery tank 40 as shown in FIG. 6. Each plate 46 is 445 mm square and has a thickness of 0.6 mm. Each plate 46 has a number of raised or convex parts 47 which are formed by press working and have respective inlets 47a. The plates 46 are stacked in the recovery tank 40 as shown in FIG. 5.

The recovery tank 40 includes an exhaust 44 to which a turbofan 51 provided with a drive motor 52 is connected. The turbofan 51 has an exhaust pipe 51a on which a silencer 55 is mounted. The turbofan 51 has the following specification:
Type BXLA11416 manufactured by Furuta Electric Machinery Co., Ltd., Nagoya, Japan
Motor output: 1.5 kW
Casing discharge side inner diameter: $\phi$ 114 mm As described above, air containing mist is drawn into the tank body 5 whose interior is maintained in a negative pressure state by operation of the turbofan 51. The impeller 17 is rotated by collision of the air flowing into the tank body 5 and the water sprayed from the nozzle 31 at a predetermined pressure or the coolant fluid of the machine tool and the mist remaining in the air is shaken off and removed by a centrifugal action of the rotary brush 20 and the shaking-off member 25 both rotated simultaneously with the impeller 17. Furthermore, the mist still remaining in the air flowing into the recovery tank 40 is collected by the louver-type demister 45. The mist/dust collector in accordance with the embodiment is thus constructed to perform the above-described operation.

The following will describe the application of the mist/duct collector A of the first embodiment to a grinding machine.

(1) A grinding machine 80 is constructed to spray coolant fluid toward works and grind stone (not shown) from a nozzle (not shown) during grinding of iron or non-iron works. Consequently, part of the coolant fluid is converted into mist, which is diffused in a closed space of the grinding machine 80.

(2) Upon operation of the collector A, the interior of the tank 5 is maintained in the negative pressure state by operation of the turbofan 51. Accordingly, the mist produced during the grinding is drawn through the suction into the introduction chamber 6 of the tank body 5 together with air therearound.

(3) The impeller 17 is rotated by collision of the air flowing through the inlet 7 into the tank body 5 and the coolant fluid sprayed from the nozzle 31 at a predetermined pressure and simultaneously, the disc rotary brush 20 is rotated at about 500 rpm. Air drawn into the instruction chamber 6 is moved toward the disc rotary brush 20 while rotating the impeller 17. Mist is shaken off by the centrifugal action of the disc rotary brush 20 and the shaking-off member 25, thereby being removed.

(4) Mist remaining in the air having flowed into the recovery tank 40 is collected by the louver-type demister 45, and the air further flows through the exhaust 44 into the turbofan 51.

(5) The mist removed from the air in the recovery tank 40 is liquefied and caused to flow back through the drain pipe 49 into a coolant tank 81.

(6) On the other hand, air having passed through the recovery tank 40 is discharged through the turbofan 51 and the silencer 55 outside the machine.

Example of Mist Concentration Measurement

The inventors measured a capacity of treating mist generated in a machine tool using the mist/duct collector A in accordance with the first embodiment under the following conditions:
Machine tool: Machining center HS6A manufactured by Mitsui Seiki Kogyo Co., Ltd., Saitama, Japan
Mist concentration in treating chamber of machining center: 2.2 mg/m$^3$
Suction air volume of the collector A: 9.8 m$^3$/min
Water supply from the ejection unit: 15 liters/min
Rotating speed of disc rotary brush 20: 600 rpm
Mist concentration measuring instrument: Piezobalance dust monitor Type 3521 manufactured by Kanomax Japan Inc., Osaka, Japan The result of the experiment shows mist concentration of 0.64 mg/m3 in the exhaust of the collector A, which value was about 29% of the concentration value in the treatment chamber of the machining center and confirmed that a mist collection efficiency was high.

Figure 7:
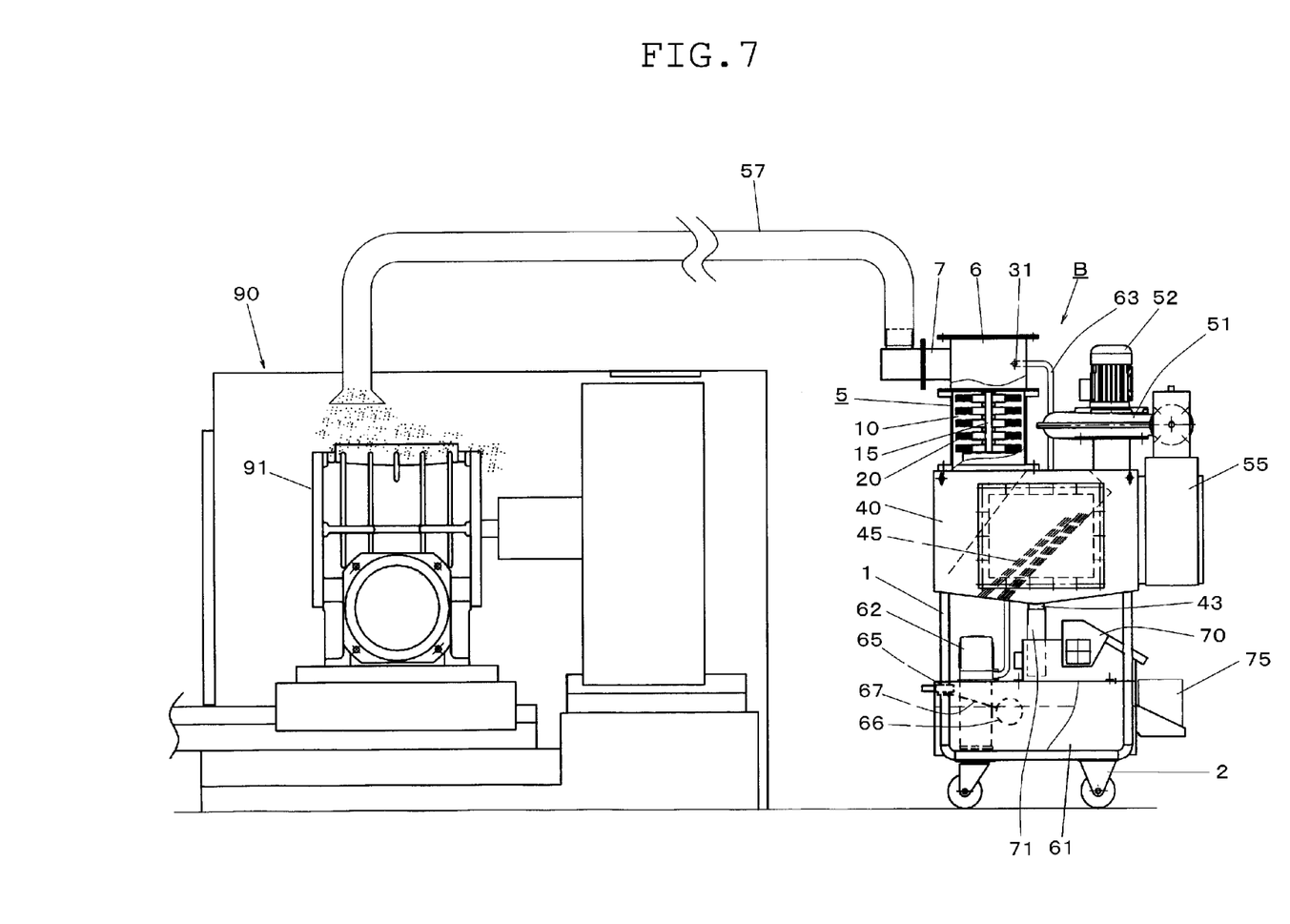
FIG. 7 is a front view of the mist/dust collector in accordance with a second embodiment.

FIG. 7 illustrates a mist/duct collector B in accordance with a second embodiment. The mist/dust collector B is constructed to be suitable for collection of dust, such as chips, produced when machine parts 91 and the like are machined by a machining center and in particular, iron fine dust.

The mist/dust collector B differs from the mist/dust collector A in the provision of a magnet separator and has the construction based on that of the mist/dust collector A in the other respect. Accordingly, identical or similar parts in the second embodiment are labeled by the same reference symbols as those in the first embodiment and the description of these identical parts will be eliminated.

A water tank 61 is installed below the recovery tank 40 to store tap water or well water. The collector B includes a spraying unit 60 which is constructed to supply the tap water or well water stored in the water tank 61 through a pipe 63 into the nozzle 31 by a circulation pump 62. A joint 65 is provided for connecting pipes through which the tap water or the like is supplied. A ball tap 66 has one end rotatably coupled with the joint 65. The ball tap 66 includes a supporting rod 67.

The magnet separator 70 has a well known structure of attracting by a magnet (not shown) iron fine dust contained in the dust separated in the tank body 5 and discharged. The fine dust separated in the tank body 5 and discharged through the exhaust pipe 43 is received by an inflow section 71 and attracted by a magnet (not shown) thereby to be removed. The iron fine dust removed by the magnet separator 70 to be discharged is stored in a recovery box 75.

As described above, air containing mist and dust is drawn into the tank body 5 whose interior is maintained in a negative pressure state by operation of the turbofan 51. The impeller 17 is rotated by collision of the air flowing into the tank body 5 and the water sprayed from the nozzle 31 at a predetermined pressure and dust contained in the air is shaken off and removed by a centrifugal action of the rotary brush 20 and the shaking-off member 25 both rotated simultaneously with the impeller 17. Furthermore, dust still remaining in the air flowing into the recovery tank 40 is collected by the louver-type demister 45, and the iron fine dust is removed by the magnet separator 70. The mist/dust collector B in accordance with the second embodiment is thus constructed to perform the above-described operation.

The operation of the collector B conforms to that of the collector A of the first embodiment and accordingly, the description of the operation of the collector B will be eliminated.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A mist/dust collector comprising:
a tank body having an air inlet and separating mist and dust from air drawn thereinto through the air inlet;
a recovery tank disposed so as to communicate with a lower part of the tank body, the recovery tank having a demister member provided therein;
a suction unit connected to an exhaust side of the recovery tank;
a spraying unit having an introduction pipe and a nozzle therein which is disposed near the air inlet so as to face an interior of the tank body, the spraying unit spraying water or a coolant fluid of a machine tool from the nozzle;
a generally vertical main shaft located at the central interior of the tank body and rotatably supported by a bearing unit;
an impeller in an upper part of the tank body, the impeller having a plurality of blades and mounted on the main shaft so as to be rotatable;
at least one disc rotary brush having a large number of brush pieces radially protruding therefrom; and
a shaking-off member mounted on the main shaft together with the impeller and the rotary brush, wherein:
the suction unit is actuated to draw air containing mist and dust into the interior of the tank body maintained in a negative pressure state;
the impeller is rotatable by a flow of the air and by collision of the water or the coolant fluid sprayed from the nozzle at a predetermined pressure and the rotary brush and the shaking-off member are rotated simultaneously with the impeller, so that the mist and the dust are separated from the air by a centrifugal action of the rotary brush and the shaking-off member; and
the mist and the dust remaining in the air flowing into the recovery tank are collected by the demister member.

2. A mist/dust collector comprising:
a tank body having an air inlet and separating mist and dust particles from air drawn through the air inlet;
a recovery tank disposed so as to communicate with a lower part of the tank body, the recovery tank having a demister member provided therein;
a suction unit connected to an exhaust side of the recovery tank;
a spraying unit having an introduction pipe and a nozzle therein which is disposed near the air inlet so as to face an interior of the tank body, the spraying unit spraying water or a coolant fluid of a machine tool from the nozzle;
a magnet separator disposed below the recovery tank and including a magnet attracting iron dust;
a generally vertical main shaft located at the central interior of the tank body and rotatably supported by a bearing unit;
an impeller in an upper part of the tank body, the impeller having a plurality of blades and mounted on the main shaft so as to be rotatable;
at least one disc rotary brush having a large number of brush pieces radially protruding therefrom;
a shaking-off member mounted on the main shaft together with the impeller and the rotary brush, wherein:
the suction unit is actuated to draw air containing mist and dust into the interior of the tank body maintained in a negative pressure state;
the impeller is rotatable by a flow of the air and by collision of the water or the coolant fluid sprayed from the nozzle at a predetermined pressure and the rotary brush and the shaking-off member are rotated simultaneously with the impeller, so that the mist and the dust are separated from the air by a centrifugal action of the rotary brush and the shaking-off member;
the mist and dust remaining in the air flowing into the recovery tank is collected by the demister member; and
iron dust contained in the dust separated in the tank body and discharged from the tank body is attracted by the magnet separator thereby to be removed.

3. The collector according to claim 1, wherein the suction unit includes a turbofan.

4. The collector according to claim 2, wherein the suction unit includes a turbofan.

5. The collector according to claim 1, wherein the demister member is formed into a louver-type demister having a number of inlets.

6. The collector according to claim 2, wherein the demister member is formed into a louver-type demister having a number of inlets.

7. The collector according to claim 3, wherein the demister member is formed into a louver-type demister having a number of inlets.

8. The collector according to claim 4, wherein the demister member is formed into a louver-type demister having a number of inlets.

9. The collector according to claim 1, wherein
the air inlet and the introduction pipe are directly attached to the upper part of the tank body and configured to introduce the air and the water or coolant fluid respectively in a flow direction perpendicular to a rotation axis of the main shaft and facing at least one of the plurality of blades.

10. The collector according to claim 2, wherein
the air inlet and the introduction pipe are directly attached to the upper part of the tank body and configured to introduce the air and the water or coolant fluid respectively in a flow direction perpendicular to a rotation axis of the main shaft and facing at least one of the plurality of blades.

11. The collector according to claim 9, wherein
the impeller is rotatable, without a motor in the main tank body, by a flow of the air and by collision of the water or the coolant fluid.

12. The collector according to claim 10, wherein
the impeller is rotatable, without a motor in the main tank body, by a flow of the air and by collision of the water or the coolant fluid.

* * * * *